(12) United States Patent
Huang et al.

(10) Patent No.: US 11,353,336 B2
(45) Date of Patent: Jun. 7, 2022

(54) GAS METER WITH GAS THERMAL PROPERTY MEASUREMENT AND AUTO-COMPENSATION

(71) Applicants: Liji Huang, Santa Clara, CA (US); Chih-Chang Chen, Cupertino, CA (US)

(72) Inventors: Liji Huang, Santa Clara, CA (US); Chih-Chang Chen, Cupertino, CA (US)

(73) Assignee: Wisenstech Ltd., Santa Clara, CA (US)

( * ) Notice: Subject to any disclaimer, the term of this patent is extended or adjusted under 35 U.S.C. 154(b) by 245 days.

(21) Appl. No.: 16/903,825

(22) Filed: Jun. 17, 2020

(65) Prior Publication Data

US 2021/0396548 A1    Dec. 23, 2021

(51) Int. Cl.
*G01D 4/00* (2006.01)
*G01F 1/684* (2006.01)
*G01F 1/44* (2006.01)

(52) U.S. Cl.
CPC ............... *G01D 4/004* (2013.01); *G01F 1/44* (2013.01); *G01F 1/6845* (2013.01)

(58) Field of Classification Search
CPC ........ G01D 4/002; G01D 4/004; G01D 4/006; G01F 1/6842; G01F 1/6845; G01F 1/696; G01F 1/6965; G01F 1/698; G01F 1/6986; G01F 1/699; G01N 25/18; G01N 27/18; G01N 1/44

See application file for complete search history.

(56) References Cited

U.S. PATENT DOCUMENTS

| | | | | |
|---|---|---|---|---|
| 8,994,552 | B2 * | 3/2015 | Jiang | H04Q 9/00 |
| | | | | 73/204.22 |
| 9,784,604 | B2 * | 10/2017 | Schirm | G01N 33/0031 |
| 9,784,607 | B2 * | 10/2017 | Wong | G01F 1/78 |
| 10,240,723 | B2 * | 3/2019 | Huang | F17C 13/02 |
| 10,634,535 | B2 * | 4/2020 | Higashi | G01F 1/692 |

FOREIGN PATENT DOCUMENTS

FR           3030034 A1 *  6/2016

* cited by examiner

*Primary Examiner* — Justin N Olamit

(57) ABSTRACT

An electronic utility gas meter using MEMS thermal mass flow sensor to meter gas custody transfer and MEMS gas thermal property sensor to compensate the metering values due to gas composition variations is disclosed in the present invention. The meter is designed to have a MEMS mass flow sensor to meter the city utility gas consumption independent of environmental temperature and pressure while a MEMS gas thermal property or dual gas thermal property sensors to compensate the tariff due to the gas composition variations for compliance with the current regulation requirements of tariff and remove the major concerns for the wide deployment of the thermal mass MEMS utility gas meters.

16 Claims, 7 Drawing Sheets

GAS METER WITH GAS THERMAL PROPERTY MEASUREMENT AND AUTO-COMPENSATION

BACKGROUND OF THE INVENTION

1. Field of the Invention

Figure 1:
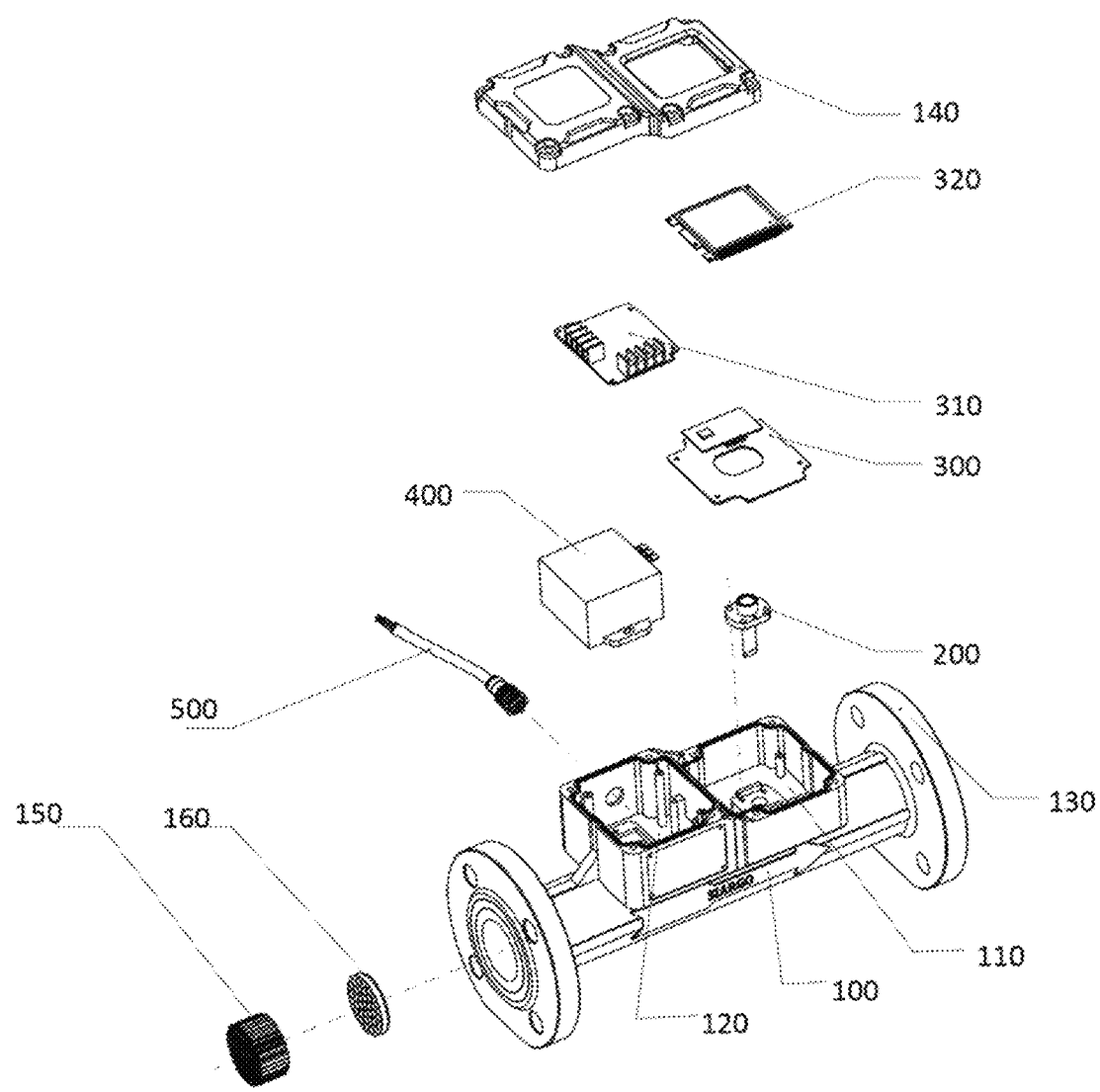

This invention relates to an apparatus for the measurement of natural gases in city gas metering. Specifically, this invention relates to a utility gas metering using micro-machined flow sensing technology to meter the city gas in the utility industry requiring custody transfer or tariff with auto-compensation of the gas properties. This invention also provides the design and make of a gas meter with auto-gas thermal value compensation with remote data capability and other intelligent functions, which can be used in the utility gas industry.

2. Description of the Related Art

In the past two decades, there are many efforts to address the fairness of the custody transfer or tariff bill in city utility gas metering as the current metering for the pure gas volume is not a true value that customers consume. The volumetric measurement can be varied due to environmental temperature and pressure changes. The current mechanical utility gas meter is calibrated against a reference temperature and pressure which can be arbitrary without a universal standard. For example, some gas meters are calibrated to a reference temperature of zero degrees Celsius. Consumers will then pay an extra +6% tariff if the ambient temperature is actually at 20 degrees Celsius. On the other hand, the mechanical utility gas meter calibrated at 20 degrees Celsius will cost the revenue of the gas companies if the meter is operating at a lower temperature. In addition, the current mechanical gas meters are unable to directly send the data to a remote data center, labor-intensive meter reading is still inevitable in many countries in the world. The adopted mechanical to electronic data converters applied to the current mechanical utility meters have solved the issue partially as the converters are often expensive and loss of mechanical to digital conversion often costs the revenue to the gas companies.

The electronic gas meter taught by Pearman et al. (A. N. J. Pearman et al, Electronic gas meter, U.S. Pat. No. 4,918,995) in 1988 is an electronic gas meter using a MEMS mass flow sensor that measures the gas consumption independent of gas temperature and pressure. However, the proposed construction and the electronics were complicated and the design was not suitable for real utility metering applications. Matter (D. Matter et al., Increased accuracy gas energy meter, U.S. Pat. No. 7,222,028) disclosed an electronic gas meter also with a MEMS mass flow sensor while having an application-specific integrated circuitry, which yielded an approach towards the current cost schedule. With a similar MEMS mass flow sensor, Muraoka et al. (Muraoka et al, Flowmeter, U.S. Pat. No. 7,861,585) disclosed an electronic gas meter for industrial utility applications, but it requires excessive protection to the sensing element leading to the extremely high-pressure drop that significantly limited its applications. It is until recently, the modified design of the electronic gas flow meter with the MEMS sensing technologies (e.g. P. Colombo, Fuel gas meter comprising a hollow space in order to prevent gas accumulation in the electronic circuitry, WO2013/150430A1; W. Wong, et al., Utility mass flow gas meter, U.S. Pat. No. 9,784,607) enables the applications in both commercial and residential utility gas metering. As of today, more than two million of such products have been deployed into the field worldwide. And the technology is generally believed to have a growing acceptance by the utility gas industry. Nevertheless, there are still some practical obstacles preventing the deployment. All of the current MEMS sensing technology adopted in the utility gas meters is based on the thermal calorimetric sensing principle, which is on the one hand independent of gas temperature and pressure but on the other, it is sensitive to the gas compositions for which a specific gas composition will have a unique thermal value. The thermal calorimetric metering will be impacted by the thermal value of the measurement gas. In Europe, the EN 437 test gas standard has classified the fuel gases into several groups and each of the groups has certain gases with a range of thermal values. Even though within the same gas group, the gas thermal value can be varied depending on the gas composition. Consequently, a utility gas meter using the MEMS calorimetric mass flow sensing will be generating different tariff bills for consumers taking the different gas compositions which are in direct conflict of the current tariff. This gas specific utility gas meter prevents the gas companies from fast deployment for concerns of consumer tariff disputes.

Therewith it is desired for this invention that a new design of the MEMS-based utility gas meter which can simultaneously measure the gas thermal properties will be necessary. The new design will be compatible with the gas independent metering in the utility gas industry while it has the advantages to compensate gas temperature and gas pressure variation throughout the seasons such that the meters could be easily adopted in different regions with various gas supply sources.

SUMMARY OF THE INVENTION

It is the objective of this invention to have a new electronic utility gas meter based on the MEMS mass flow sensing technology for city gas metering applications that will be compatible with the current metrology and tariff requirements or practice of the city utility gases while the MEMS mass flow sensing capability will provide the automatic compensations to the volumetric gas values due to gas temperature and pressure variations. This disclosed meter will further have the capability to auto-compensate the variation of the gas thermal values and perform the compensation such that it shall not create the tariff differences among the users with existing mechanical meters and the disclosed electronic meter. The disclosed utility gas meter will also have the functionality that can ensure the data safety, data process and transmission remotely to the designated data center as well as the system protection class per the utility industry.

In one preferred embodiment, the disclosed utility gas meter that is capable of in situ gas thermal property measurement and auto-compensating to the variation of the gas composition during the continued measurement will utilize a plural number of MEMS mass flow sensing chips to sense both the mass flow of the media as well as the gas properties. Whilst the M EMS thermal mass flow sensing can only measure the thermal properties of the gas media, and it cannot perform the gas chemical component analysis, the utility gas metering tariff, on the other hand, only requires the final measurement fairness that does not require the detailed knowledge of the gas chemistry. Therefore, as long as the said MEMS gas properties sensor can register correctly the changes in the flow media properties and reference back to the calibration media properties, the gas properties effects can be eliminated resulting in the tariff that is independent of gas properties. Nevertheless, the registered gas properties can be used further for evaluation of the tariff based on gas thermal values which shall be the ultimate desired tariff since the thermal value is the one that consumers actually apply.

In another preferred embodiment, the disclosed utility gas meter that is capable of in situ measurement of the gas thermal properties and performing compensation to the variation of the gas compositions during the continued measurement metering of the utility gas. The gas meter will utilize the MEMS mass flow sensor for metering the mass flowrate of the utility gas for the desired temperature and pressure independent tariff. The MEMS mass flow sensor will have integrated thermistors that can also be used to measure the temperature changes during the metering of utility gas media flowrates. This MEMS mass flow sensor can be one of those disclosed earlier by the same inventors, but it will be packaged together in the close proximity to the said gas thermal property measurement sensors in order to compensate the tariff variation due to the direct measured thermal mass flowrate that is dependent on the gas compositions or gas thermal properties.

In another preferred embodiment, the disclosed MEMS gas thermal property sensor packaged in close proximity to the MEMS sensor that measures the mass flow but in a separated and well-sealed space with only one small window open to the gas media such that the gas flow will not be impacting the gas thermal property measurement. In this static gas condition, the said MEMS gas property sensor is to sense the thermal conductivity and thermal capacitance of the gas properties, and further it can measure the thermal diffusivity of the gas. The thermal conductivity measurement is ideally to be performed with a MEMS sensor made on silicon substrate where the sensing elements are placed on a membrane with a underneath cavity for thermal isolation of the sensing elements. The sensing elements are preferred to be made of materials of large temperature coefficients or sensitive to the thermal conductivity changes, such as doped polycrystalline silicon, platinum, nickel and other similar materials. For the best performance to eliminate long term shift, two identical thermistors will be used for the measurement. One thermistor will be covered with inert yet highly thermal-conductive materials such as silicon nitride or silicon carbide, and another thermistor with identical shape and resistance value shall be open to the gas media. By comparing the simultaneously acquired thermal conductivity values, any electronic related shifts can be canceled out and a stable thermal conductivity value can be obtained. To measure the thermal diffusivity, one of the said two thermistors will be applied a pulsed or periodic voltage, and the time difference of the elevated temperature received by another thermistor right next to the heated thermistor will be the direct measurement of the thermal diffusivity. When the gas composition changes in the flow media, the gas thermal property sensor will register the changes and then it will feedback to the mass flow sensor, the mass flow sensor will then adjust the control heating micro-thermistor to accommodate the gas thermal value variation and normalized the value to the calibration. The results of such metering value will then be consistent with the current tariff standard which is independent of the gas compositions or thermal values. This said measurement and compensation scheme does not require a pre-register of gas compositions as the gas thermal property sensor will not be able to identify the chemical composition of the gases but to register and feedback any thermal values regardless of the gas chemical compositions. As long as a deviated thermal value is measured, the mass flow sensor will perform the algorithm to adjust the control electronics to match the control to those conditions at calibration which is set to be consistent with the current tariff and metrology requirements.

In another preferred embodiment, the disclosed MEMS gas thermal property sensor packaged in close proximity to the MEMS mass flow sensor is preferred in a dual sensor configuration to ensure the measurement value is precise for the allowed metrology standard. In this configuration, a well-sealed space will be divided into two spaces. One space will host a gas thermal property sensor that will be completed sealed with reference gas such as air or nitrogen, or methane. Another space will host a second gas thermal property sensor with identical parameters but the space will have only one window open to the flow media. The sensor sealed with the reference gas will be used as the reference for the offset and baseline to the other one that in direct contact with the measurement gas. These two sensors in the sealed spaces will be packaged in proximity to the mass flow sensor providing the feedback to the control electronics such that when the gas thermal property varies, the control electronics can be auto-adjusted to compensate for the variation induced tariff.

In another preferred embodiment, the disclosed utility gas meter with the thermal mass flow sensing technology and simultaneously measured gas thermal properties for compensation of the tariff due to gas composition variations will be constituent with the MEMS sensing assembly including the mass flow sensor and the gas thermal property sensors in close proximity, the main flow channel; the electronic control unit that has all the electronics providing the signal conditioning of the MEMS sensing assembly, data acquisition from the MEMS sensing assembly, data processing, data safety management, data interface for data transmission and the remote user communication as well as the power supply such as the lithium-ion battery pack. The electronics control unit will further relay the processed data to a local display, preferably made of a low power LCD, and manage the power usage of the system. Additional components include the local data communication port, the meter covers and other parts for managing the gas flow profile, mechanical connection and gas sealing from leakage.

In another preferred embodiment, the disclosed utility gas meter with the thermal mass flow sensing technology and simultaneously measured gas thermal properties for compensation of the tariff due to gas composition variations will be preferred to have a flanged mechanical connection with the MEMS sensing assembly configured into a probe which is inserted into the center of the main flow channel that is made with a Venturi structure for better flow stability. It is preferred that the insertion MEMS sensing assembly will also be configured to have the MEMS mass flow sensor being placed at the tip of the probe where the sensor is supported on a printed circuitry board and further embedded into a thin metal plate with its front edge towards the flow direction in a sharp slop forming a boundary layer to ensure the flow redistribute across the mass flow sensor with a laminar flow. For further enhancement of gas flow stability and measurement repeatability, a pair of flow straightener and conditioner is placed at the inlet of the main flow channel. This disclosed meter with the Venturi flow channel and a pair of flow straightener and conditioner ensures the high accuracy and performance that will be critical for city utility gas custody transfer or tariff applications.

In another preferred embodiment, the disclosed utility gas meter with the thermal mass flow sensing technology and simultaneously measured gas thermal properties for compensation of the tariff due to gas composition variations will also register the gas thermal values at each gas composition change event. This functionality is preferably performed for the database to future upgrade with thermal value tariff. At the pre-programmed time period, both of the said sensors will send the measured data to the control electronics that will execute the comparison between the values registered in its memory with the current measured values. If any differences are above the preset limit, an alarm will be triggered and registered that will be translated into an event to be stored in a separate memory in the control electronics. The corresponding event code will be displayed on the meter's local display. The meter will then proceed to execute the automatic gas composition or thermal value compensation. In case that the meter is connected to the network, the registered event will be automatically transmitted to the designated data or service center.

In another preferred embodiment, the disclosed utility gas meter with the thermal mass flow sensing technology and simultaneously measured gas thermal properties for compensation of the tariff due to gas composition variations will have plural numbers of memory units. It is preferred that for data safety and tariff dispute prevention, such numbers of memory units shall not be less than three in case of any malfunctions may happen. The measured mass flowrate metrology data shall be stored independently into these memories via a factory preset program or a user-programmable interface. These data in the independent memories will be able to be retrieved onsite or be transmitted to the designated data or service center at a time interval determined by the user. The stored data will further be able to be retrieved by an external reader via the local data communication. These data will be compared from time to time via the onboard microcontroller unit (MCU). In case of any discrepancy, an event or alarm will be registered at a different memory that can be retrieved onsite or be transmitted to the designated data or service center if the meter is connected to the network.

In yet another preferred embodiment, the disclosed utility gas meter with the thermal mass flow sensing technology and simultaneously measured gas thermal properties for compensation of the tariff due to gas composition variations will have the networking capability which is preferable as an exchangeable independent module inside the said meter. Such a configuration will extend the usage of the meter at different geographic locations where the networking system or protocol could be vastly different. The said module can be independently programmed or manufactured according to the order specifications.

For the adoption of the utility gas meters for city gas metering with the thermal mass sensing technology, this disclosure provides a solution for metrology inconsistency due to the gas composition variations with the currently accepted metrology standards and tariff system. The disclosure will have the desired performance to remove the temperature and pressure variations while the simultaneously measured gas thermal properties will be made available for future upgrades for energy management. In particular, the said meter can be data logged and remotely managed via the network without the requirements of add-on mechanical to electronic data conversion that is not only costly but does not provide the desired performance. Further, the said disclosure can also be connected to an external valve or valve with tariff collection for ultimate safety or some pre-payment tariff schedule requirements.

Other objects, features and advantages of the present disclosure will become apparent to those skilled in the art through the present disclosures detailed herein wherein like numerals refer to like elements.

BRIEF DESCRIPTIONS OF THE DRAWINGS

FIG. 1: The explosive view of the disclosed utility gas meter assembled with the thermal mass flow sensing technology and simultaneously measured gas thermal properties for compensation of the tariff due to gas composition variations.

Figure 2:
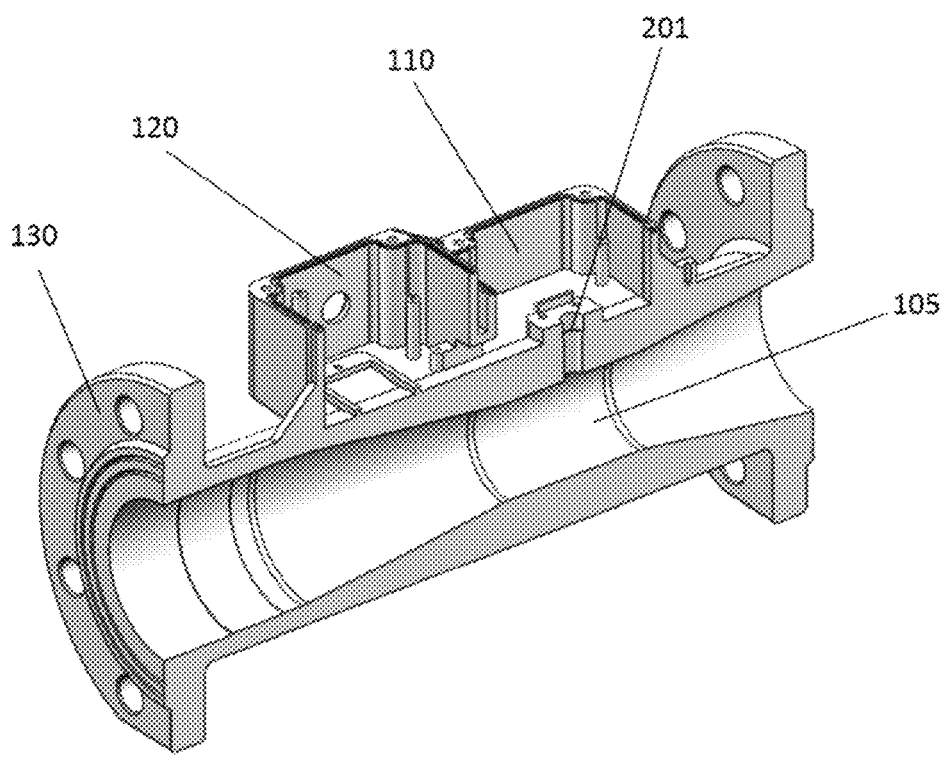

FIG. 2: The perspective view of the disclosed utility gas meter showing the flow channel design and the sensor probe assembly path.

Figure 3:
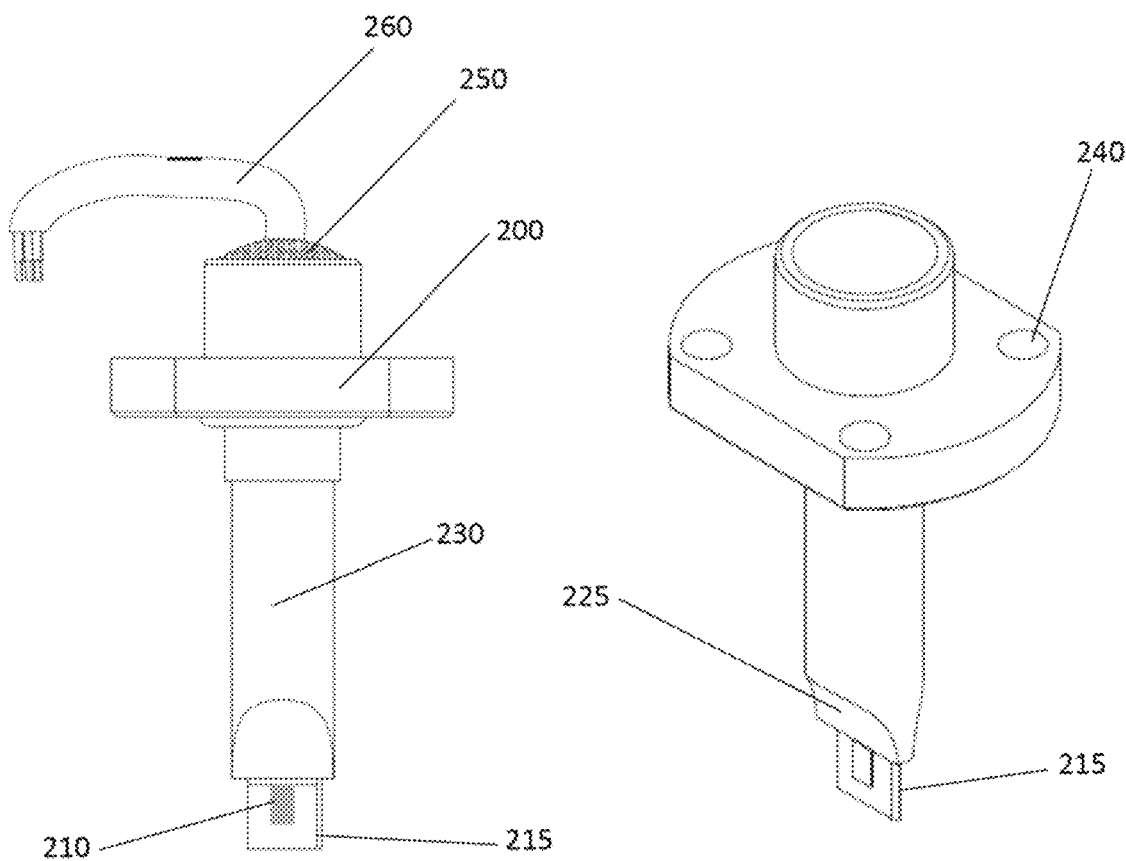

FIG. 3: The design of the M EMS flow sensing assembly with the key elements.

Figure 4:
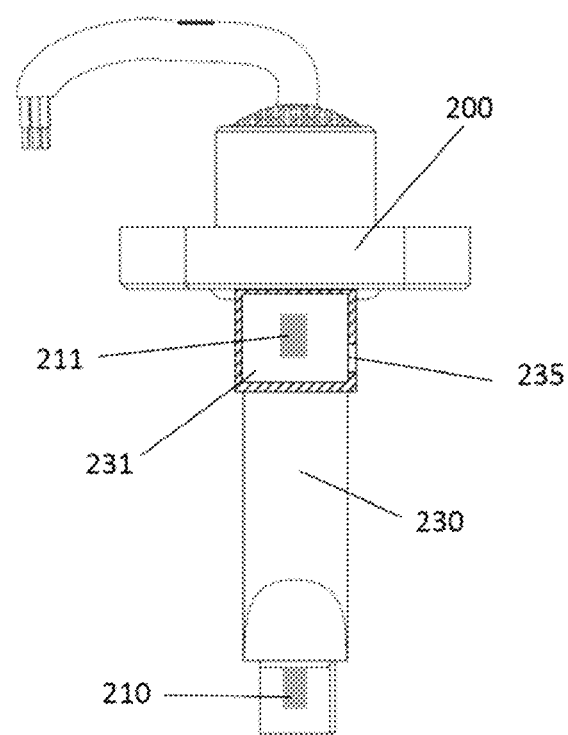

FIG. 4: The design of the MEMS flow sensing assembly with the gas thermal property sensors packaged in close proximity to the flow sensing element.

Figure 5:
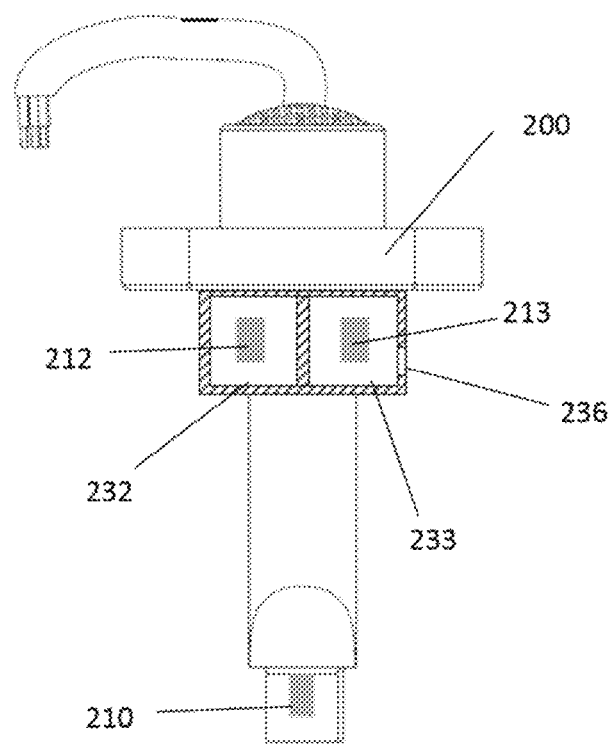

FIG. 5: Alternative version of MEMS flow sensing assembly to further improve the performance of the gas thermal property sensor.

Figure 6:
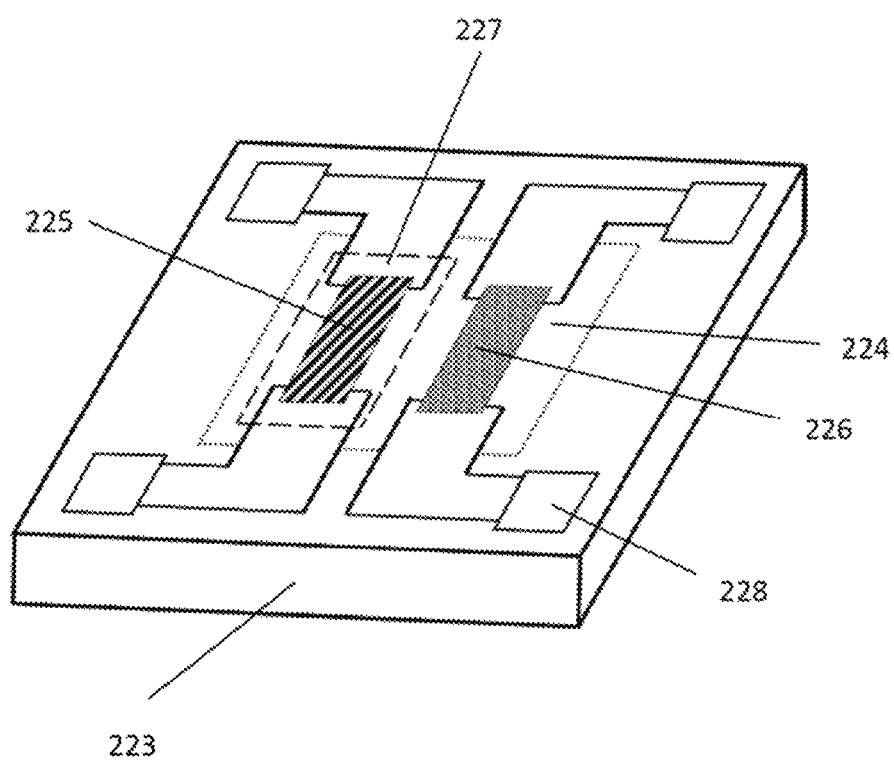

FIG. 6: The final assembly of the disclosed utility gas meter with gas thermal property measurement and auto-compensation.

Figure 7:
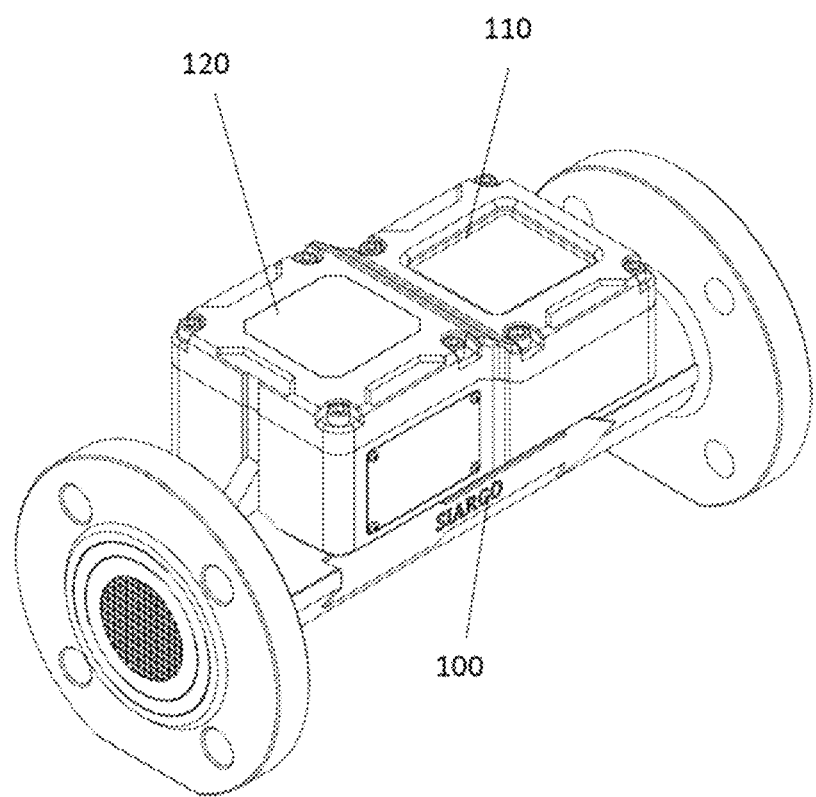

FIG. 7: The design of a MEMS gas thermal property measurement sensor.

DETAILED DESCRIPTION OF THE PREFERRED EMBODIMENTS

The explosive view of the gas meter using MEMS sensing elements for the metrology and gas thermal property measurement of city utility gas disclosed in this invention is shown in FIG. 1. The gas meter is having a metal molded meter body (100). The meter body is constituent of a flow channel having the standard connection sizes of the city utility gas pipes (130), a control electronics chamber hosts the data acquisition, communication and display electronics (110), and the power/battery pack chamber (120). Further, the pipe connection is preferable to be flange type for easier installation and maintenance but it can also be threaded when replacing some of the existing mechanical meters. The meter body (100) will be made with cast aluminum alloy or stainless steel in compliance with the utility industry standards for surviving in the long term filed service time. The MEMS sensor assembly (200) having the mass flow sensing and gas thermal property sensing elements will be made into an insertion probe formality that can be placed into the flow channel for data acquisition. The control electronics printed circuitry board (300) will have the functions of acquisition of the raw data from the MEMS sensing elements, amplification and conversion of the analog data via a high precision analog to digital converter (ADC) into digital ones for processing by the microcontroller (MCU) where the digital data are compared to those installed at the calibration to output the correct metering value. Simultaneously, the gas thermal property will also be acquired from the gas thermal property sensors and compared to those stored at the calibration. The MCU will then invoke the algorithm for the gas thermal property or gas composition variation compensation once such variation is detected. Each compensation event and the corresponding data will also be stored on the same board at plural numbers of solid memories for data safety. The remote data communication is preferably to be performed via the industry standard protocol such as NB-IoT or GPRS or other standards depending on the geographic locations. The Display (320) is preferable to be a liquid crystal display (LCD) for the desired low power operation of the said meter. Additional tasks by the control electronics will include the detection of battery power status, flowrate abnormality and others which are interests to the users and be pre-programmed. The meter cover (140) will be made with the same materials as the meter body and the seal to the meter component chambers will be done via gaskets and screws to meet the protection class requirement since the meters are usually placed outdoor with direct exposure to the open space in the environment. The power battery pack chamber (120) will hosts the sealed battery pack (400) and the connection terminal (310) that connects to both the control electronics supplying the power and data port. For the data safety, a local data port with a data cable (500) will provide the data access by the users in case the remote communication will be disrupted for various reasons. This data port will also serve for the local GPRS connection and external power supply in case the battery cannot support the required communication power consumption. In order to achieve the custody transfer or tariff required accuracy, a pair of the flow dynamic constrainers will be installed at the inlet of the flow channel of the said utility gas meter. The outer block (150) is a flow straightener which removes the turbulent instability and it is then followed by a flow profiler (160) which forces the flow into a desired profile to ensure the measurement repeatability and accuracy. The straightener and the profiler are normally separated at a distance which is not longer than half of the flow channel diameter for the best performance.

The component chamber is designed and made into two separated but closely connected ones. The control electronics chamber is normally sealed with tamper proof as it serves the metering tariff data. The seal can be done by a third authorized party per the local regulation requirements. This will ensure the integrity of tariff data and prevent any tamper. The independent battery pack chamber also makes the change of the battery easier as the battery pack would be required to be changed since the battery may be consumed in a much shorter time than the meter service lifetime. The other detailed components used for making of the disclosed 1 utility gas meter are illustrated in FIG. 2 by the perspective view of a portion of the preferred meter in FIG. 1. The flow channel (105) is made with a Venturi shape where the sensor assemble is inserted into the flow channel at its throat from the control electronics chamber through opening (201). The Venturi profile will provide an acceleration of the medium flow speed at its throat position where the sensor will have the enhanced sensitivity.

The detailed making of the MEMS sensor assembly (200) is illustrated in FIG. 3 which exhibits the mass flow sensor chip (210) that is placed at the tip of the insertion probe (230) sensor assembly. The mass flow sensor (210) will be preferable to be made with MEMS mass flow sensing technology and operate with calorimetic sensing principle that is independent of environmental temperature and pressure variation. The stem of the insertion probe will be preferred to be a circular form while towards its tip where the MEMS mass flow sensor is places the circular form will be changed into a "V" shape (225) for the better flow profile and stability. The MEMS mass flow sensor chip on a carrier printed circuitry board is embedded into the thin tip plate that is preferred to be made of stainless steel. The front side of the plate (215) will have a slope to form the boundary layer in the flow medium such that the flow medium across the plate and being sensed by the MEMS flow sensor will be forced to re-profiled into a laminar flow that results in a best measurement conditions for the MEMS mass flow sensor. The said MEMS sensor assembly will be sealed to the meter flow channel and fixed with screws via the installation positions (240). The seal of the wire connection (260) can be achieved with nonvolatile epoxy (250).

The placement of gas thermal property sensors is exhibited in FIG. 4. The sensor (211) is preferred to be placed in a sealed space (231) at the stem of the MEMS sensor assembly probe (230). The sealed space will only have one small window open to the flow medium which provides the gas exchanges when the flow medium composition is changed. The window can be further installed with a filter that can be effectively filtering out the impurities such as oil vapors or particles or other foreign materials. The sealed space will allow the gas thermal property sensor not to be impacted by the medium flow which can introduce additional temperature effects for the sensor. The position of the said space to host the gas thermal property sensor will also have the lowest flow rate of the flow due to the flow profile inside a closed conduit or channel. To further improve the performance of the gas thermal property sensor, an alternative configuration is exhibited in FIG. 5 where the said space for the gas thermal property sensor is divided into two with the identical size (232 and 233). Each of the space will have one gas thermal property sensor installed, but one sensor (212) will be completed sealed in the space (232) filled with reference gas such as methane or air or nitrogen, and another identical gas thermal property sensor (213) in the identical sized space (233) will have a small window (236) open to the gas flow medium to be measured. The window will also be installed with the filter that can be effectively filtering out the impurities such as oil vapors or particles or other foreign materials. These two sensors (212 and 213) will be operating in a differential circuitry such that any electrical drifting can be fully eliminated to ensure the high precision of the gas thermal property measurements which is critical for the tariff compensation due to the gas composition (thermal property) variations.

The design and structure of the said gas thermal property sensor is exhibited in FIG. 6 where the sensor is preferred to be made with the MEMS sensing technology. The said sensor will have a silicon substrate (223) on which a thermal isolation cavity (224) is made beneath a membrane composed of low stressed silicon nitride and silicon dioxide that can be made with low pressure chemical vapor deposition. The gas thermal property sensing elements (thermistors) can be made with materials of high temperature coefficient for better sensitivity such as platinum, nickel or doped polycrystalline silicon. These two thermistors (225 and 226) will be made with the identical size and resistance value but one thermistor (225) will be open to the flow gas medium to be measured while another one (226) will be passivated by a thin film such as silicon nitride. In the actual making process, an etching process to the passivation film can be performed to open the window (227) such that the thermistor (225) will be in direct contact with the flow gas medium. In the static gas environment, the gas thermal conductivity, K, can be measured by the elevated temperature of the heated thermistor, and the thermal capacitance, $C_p$, can be measured by the elevated temperature of the adjacent thermistor due to the diffusivity, D:

$$D = \frac{K}{\rho\, C_p}$$

Where ρ is the gas density. These two thermistors will be operation in a differential mode such that the thermal instability and temperature effects of the thermistor can be removed for the enhanced gas thermal property measurement accuracy. Each of the thermistors will be connected to the wire bonding pads (228) that are placed symmetrically at the four corners of the silicon substrate.

The final assembly of the said preferred utility gas meter (100) is exhibited in FIG. 7 where the battery pack chamber (120) is covered and sealed with a sold metal made with the same materials of the meter body, while the control electronics chamber (110) will be sealed with a cover having a glass window and additional tamper proof mechanism which would be dependent on the regulations by the local tariff authority where the meter will be applied. For the ultimate protection and tamper proof, the glass window will be coated a transparent metal film which will be anti-electrical magnetic radiation or other external interferences.

The invention claimed is:

1. An electronic utility gas meter, the electronic utility gas meter configured for compensation of a tariff due to a composition variation in a gas, comprising:
   a MEMS mass flow sensor for metering the gas, the MEMS flow sensor operating with a calorimetric sensing principle;
   at least one MEMS gas thermal property sensor for measurement of gas thermal properties, the at least one MEMS gas thermal property sensor providing feedback for a mass flow measurement to compensate data such that tariff changes due to the composition variation can be eliminated in the tariff;
   a meter body that comprises a Venturi flow channel, a pair of flanged or threaded mechanical connections, and two component chambers to host a control electronics printed circuitry board and a battery pack;
   the control electronics printed circuitry board configured for acquisition of sensor data from the MEMS mass flow sensor and the at least one MEMS gas thermal property sensor, processing data compensation, performing data communication; managing power, providing onboard data storage, displaying metering information, and managing failure events;
   a data communication port with wired and wireless options that enable data transmission, allow manual access to the onboard data storage, enable programming of user specified functions, and enable diagnosis of meter performance;
   a pair of flow conditioning devices that perform flow straightening and flow profiling; the pair of flow conditioning devices installed at an inlet of the Venturi flow channel;
   the battery pack provides power to the MEMS mass flow sensor, the at least one MEMS gas thermal property sensor, and the control electronics printed circuitry board; and
   a pair of meter covers that seal the two component chambers and that include a display window,
   wherein said MEMS mass flow sensor is located at a tip of an assembly probe and the at least one MEMS gas thermal property sensor is located on a stem of the assembly probe in a space located away from the tip, the space having a window open to the gas, the window having a filter to filter contaminants.

2. An electronic utility gas meter of claim 1, wherein said calorimetric sensing principle is independent of variations in environmental temperature and pressure variation.

3. The electronic utility gas meter of claim 1, wherein said at least one MEMS gas thermal property sensor utilizes a heated thermistor to measure thermal conductivity and thermal diffusivity.

4. The electronic utility gas meter of claim 3, wherein said at least one gas thermal property sensor comprises a silicon substrate with a thermal isolation cavity and a membrane, the membrane having a thickness between 0.6 to 4 micrometers, and the membrane comprising silicon nitride or silicon dioxide.

5. The electronic utility gas meter of claim 3, wherein said at least one MEMS gas thermal property sensor comprises two thermistors identical in sizes and resistance values, the two thermistors made of platinum, nickel or doped polycrystalline silicon.

6. The electronic utility gas meter of claim 3, wherein said at least one MEMS gas thermal property sensor comprises two thermistors operating with differential circuitry to eliminate any electrical and external temperature effects.

7. The electronic utility gas meter of claim 1, wherein said at least one MEMS gas thermal property sensor comprises a sealed space split into two identical sized spaces, one space of the two identical sized spaces having a thermistor sealed with a reference gas, the other space of the two identical spaces having the window.

8. The electronic utility gas meter of claim 1, wherein said sensor assembly is inserted into the flow channel with the MEMS mass flow sensor at the tip of the assembly probe placed at a central position of the Venturi flow channel.

9. The electronic utility gas meter of claim 1, wherein said pair of flow conditioning devices comprise a flow straightener and a flow profiler sequentially installed at the inlet of the Venturi flow channel; a distance between the flow profiler and the flow straightener is between one sixth to one half of a diameter of the Venturi flow channel.

10. The electronic utility gas meter with of claim 1, wherein said control electronics printed circuitry board is configured to provide a mass flowrate and the gas thermal properties; the control electronics printed circuitry board is configured to keep the data in a plural number of solid memories; the control electronics printed circuitry board is configured to perform power status monitoring and evaluation, and send an alarm at a fixed time period that can be programmed in advance before an end of battery power.

11. The electronic utility gas meter of claim 1 mechanical connections are the flange type.

12. The electronic utility gas meter of claim 1, wherein said data communication port is configured to serve as a local data access port for manual data download and meter failure diagnosis.

13. The electronic utility gas meter of claim 1, wherein said control electronics printed circuitry board is configured to provide an interface for the wired and wireless options.

14. The electronic utility gas meter of claim 1, wherein said battery pack can provide a field operation time of not less than three years.

15. The electronic utility gas meter of claim 1, wherein said display window is configured to withstand external interference by an electrical magnetic field and to be tamper proof; the display window comprising transparent metal films.

16. An electronic utility gas meter, the electronic utility gas meter configured for compensation of a tariff due to a composition variation in a gas, comprising:
   a MEMS mass flow sensor for metering the gas, the MEMs mass flow sensor operating with a calorimetric sensing principle;

at least one MEMS gas thermal property sensor for measurement of gas thermal properties, the at least one MEMS gas thermal property sensor providing feedback for a mass flow measurement to compensate data such that tariff changes due to the composition variation can be eliminated in the tariff;

a meter body that comprises a Venturi flow channel, a pair of flanged or threaded mechanical connections, and two component chambers to host a control electronics printed circuitry board and a battery pack;

the control electronics printed circuitry board configured for acquisition of sensor data from the MEMS mass flow sensor and the at least one MEMS gas thermal property sensor, processing data compensation, performing data communication; managing power, providing onboard data storage, displaying metering information, and managing failure events;

a data communication port with wired and wireless options that enable data transmission, allow manual access to the onboard data storage, enable programming user specified functions, and enable diagnosis of meter performance;

a pair of flow conditioning devices that perform flow straightening and flow profiling; the pair of flow conditioning devices installed at an inlet of a flow channel;

the battery pack provides power to the MEMS mass flow sensor, the at least one MEMS gas thermal property sensor, and the control electronics printed circuitry board; and a pair of meter covers that seal two component chambers and that include a display window, wherein said at least one MEMS gas thermal property sensor utilizes a heated thermistor to measure thermal conductivity and thermal diffusivity, wherein said heated thermistor is passivated with a thermally conductive material, the at least one MEMS gas thermal property sensor further comprising another thermistor open to the gas.

* * * * *